United States Patent [19]

Parsons

[11] 4,238,156
[45] Dec. 9, 1980

[54] PHOTOGRAPHIC REPROPORTIONING SYSTEM

[76] Inventor: James C. Parsons, 1414 Laurel Ave., Minneapolis, Minn. 55403

[21] Appl. No.: 23,906

[22] Filed: Mar. 26, 1979

[51] Int. Cl.³ .................... G03B 27/10; G03B 27/68
[52] U.S. Cl. ........................................ 355/52; 355/84
[58] Field of Search ................. 355/52, 53, 67 S, 74, 355/84, 103

[56] References Cited

U.S. PATENT DOCUMENTS

| | | | |
|---|---|---|---|
| 683,573 | 10/1901 | Pasquarelli | 355/67 S UX |
| 1,176,384 | 3/1916 | Lotka | 355/52 UX |
| 1,669,027 | 5/1928 | Seymour | 355/52 UX |
| 2,617,337 | 11/1952 | Snyder | 355/52 UX |
| 2,838,939 | 6/1958 | Schlegel | 355/52 UX |
| 3,051,042 | 8/1962 | Maurer | 355/52 UX |
| 3,066,572 | 12/1962 | von Bubna-Littitz | 355/52 UX |
| 3,115,081 | 12/1963 | Bruce | 355/103 |
| 3,126,809 | 3/1964 | Adams et al. | 355/52 UX |
| 3,158,077 | 11/1964 | Miller et al. | 355/103 |
| 3,204,543 | 9/1965 | O'Keeffe | 355/52 UX |
| 3,269,286 | 8/1966 | Fuchs et al. | 355/52 UX |
| 3,309,959 | 3/1967 | Rondthaler et al. | 355/52 UX |
| 3,374,724 | 3/1968 | Torres | 355/52 X |
| 3,401,616 | 9/1968 | Cross | 355/84 |
| 3,445,165 | 5/1969 | Dubbs | 355/84 |
| 3,767,301 | 10/1973 | Solo | 355/52 |
| 3,992,094 | 11/1976 | Adcock | 355/84 |
| 4,008,959 | 2/1977 | Parsons | 355/52 X |

OTHER PUBLICATIONS

Colight . . . Type-Flex Adv., 6/24/69, Minneapolis, Minn.
Type-Flex Reproportioning System, Snook Corp.
Type-Flex Junior Adv., Snook Corp.
R. I. Bulletin, Stretch or Squeeze Without a Lens, Dec. 15, 1975.
Snook Corp., Miscellaneous Photo Reproportioning Machines, 9/1976.
May 1977, Squeeze Lenses vs Photomechanical Newspaper Production Flexing.

Primary Examiner—Donald A. Griffin
Attorney, Agent, or Firm—Burd, Bartz & Gutenkauf

[57] ABSTRACT

A photographic reproportioning apparatus for changing one dimension of a two-dimension image projected on a photosensitive member having a main travel board supporting a sub-travel board for movement in a linear path. The boards are shielded from a light source with an opaque mask having an exposure window to expose the photosensitive member as it moves relative to the window. Motion transmitting structure operates to move the sub-travel board at the same speed or less than the speed of the main travel board. The motion transmission structure has an adjustable speed control bar connected to a first drive mounted on the main travel board. The first drive operates a second drive mounted on the main travel board and connected to the sub-travel board. The speed of movement of the first drive depends on the angular position of the speed control bar relative to the longitudinal path of movement of the main travel board and the speed of the main travel board. The first drive also rotates a wheel. The wheel is used with the main travel board to change the linear image to an arcuate image. The mask has a second tapered exposure window that diverges away from the axis of rotation of the wheel to provide an even light exposure along the length of the exposure line. The mask with the tapered exposure window is used when the wheel and main travel board are used to make an arcuate image.

60 Claims, 12 Drawing Figures

FIG.12

PHOTOGRAPHIC REPROPORTIONING SYSTEM

SUMMARY OF INVENTION

The invention is directed to an apparatus useable to change one dimension of a two-dimension image on a photosensitive member. The general subject matter of the invention is disclosed in U.S. Pat No. 4,008,959. The apparatus is operable to selectively stretch or squat a two-dimensional graphic representation in one direction a predetermined amount. Back slant, italicize, and arcuate functions can be achieved with the apparatus.

The apparatus has a support movably carrying a main travel board having a surface for carrying a sheet having an image thereon or a photosensitive member, as a film or sheet. A drive means operates to move the main or first travel board in a linear direction or along a linear path. A second travel board having a surface for carrying a sheet having an image thereon or a photosensitive member is mounted on the first travel board for movement relative to the first travel board in the direction of movement of the main travel board. The first travel board has a longitudinal recess accommodating the second travel board. The first and second travel boards have surfaces located in the same general plane for supporting the sheet or photosensitive member. The structure mounting the second board on the first board includes linear rods secured to the main travel board and bearings slidably mounted on the rods and connected to the second travel board. Both travel boards are masked with an opaque means from a light source. The opaque means is associated with means having an elongated exposure window or exposure line extended transversely of the direction of movement of the boards.

Control means cooperating with the travel boards operate to move the second travel board in the linear direction at a speed equal to or less than the speed of the first travel board in response to movement of the first board by the drive means. The control means includes a control rod movably mounted on the support. The single control rod is useable to control the amount of reproportioning, the angle of back slant and italic, and the radius of curvature of the arc of the image on the photosensitive member.

An adjusting means is used to hold the control rod in a selected position which determines the amount of relative movement between the first travel board and second travel board. A first drive is operatively associated with the control rod and mounted on the first travel board. The first drive cooperates with a second drive mounted on the first travel board and connected to the second travel board. Movement of the first drive moves the second drive. A speed reducing dual pulley drivably connects the first drive with the second drive. Movement of the second drive moves the second travel board relative to the main travel board in the direction of movement of the first travel board at the same or less speed than the first travel board.

A wheel is rotatably mounted on the support adjacent the first travel board. The first drive operates to rotate the wheel in response to linear movement of the first travel board caused by the operation of the drive means. The wheel is used to move the photosensitive member in an arcuate path relative to the linear movement of the sheet having an image on the first travel board. The result is a change of a linear image on a negative or positive to an arcuate graphic representation of the image on the photosensitive member. An exposure line having an outwardly tapered or diverging shape is used with the rotating wheel to provide for uniform exposure of the photosensitive member along the length of the exposure line. The radius of curvature of the image on the photosensitive member is controlled by controlling the speed of rotation of the wheel. This is done by changing the angle of the control rod relative to the linear direction of movement of the main travel board.

DESCRIPTION OF PREFERRED EMBODIMENT

Figure 1:
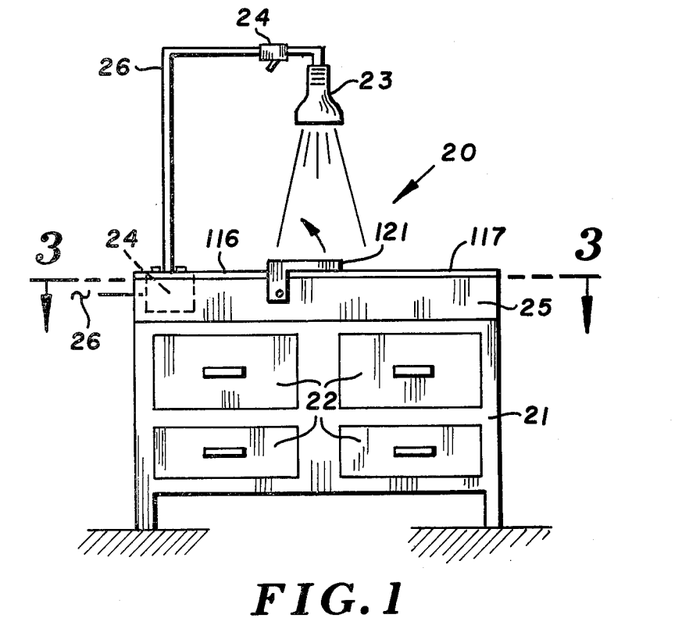
FIG. 1 is a front elevational view of the photographic reproportioning apparatus of the invention mounted on a cabinet.

Referring to FIG. 1, there is shown a photographic reproportioning apparatus of the invention indicated generally at 20 supported on a cabinet 21. Cabinet 21 has a plurality of drawers 22 providing storage space for photographic film and negatives. Cabinet 21 can be any suitable stand or support for locating the photographic reproportioning apparatus 20 at a convenient working height.

A light source 23, as an electric light, is located above apparatus 20 in a generally central vertical location. Light source 23 is electrically connected to a control unit 24 mounted on apparatus 20 with suitable electric line or cable 26. A power source 27, as the conventional 110 A.C. power, is connected to control unit 24. The light source can be located in a housing positioned over the exposure window 124. The front of the apparatus has a front panel 25 attached to a frame or support 28. Support 28 is a metal plate having a flat upper surface.

Figure 3:
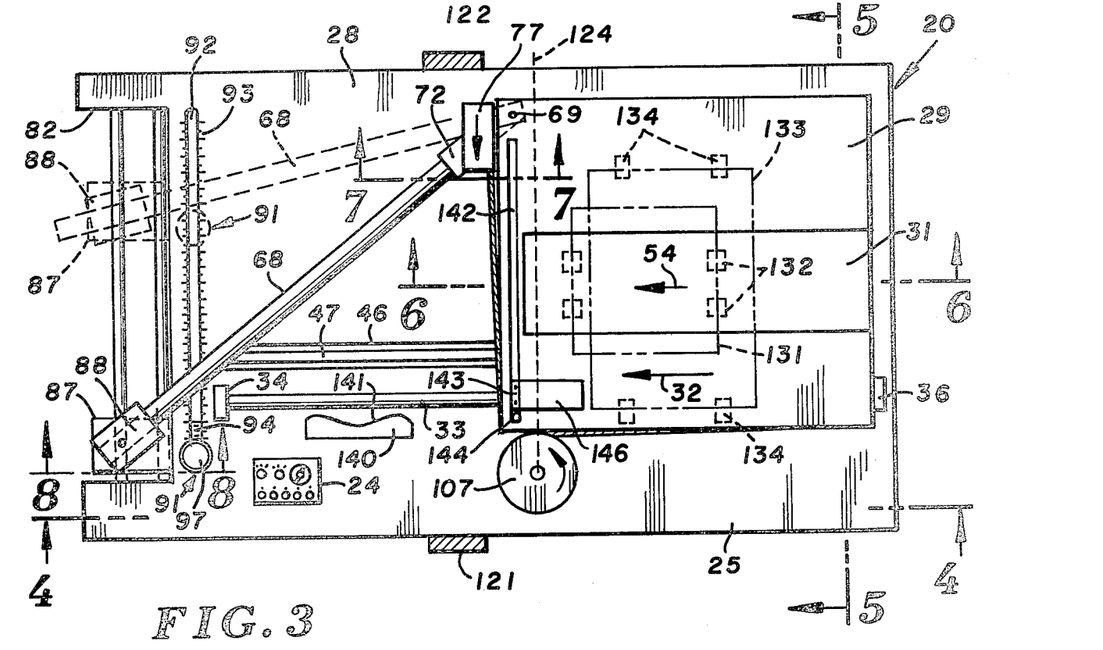
FIG. 3 is an enlarged sectional view taken along line 3—3 of FIG. 1.
Figure 5:
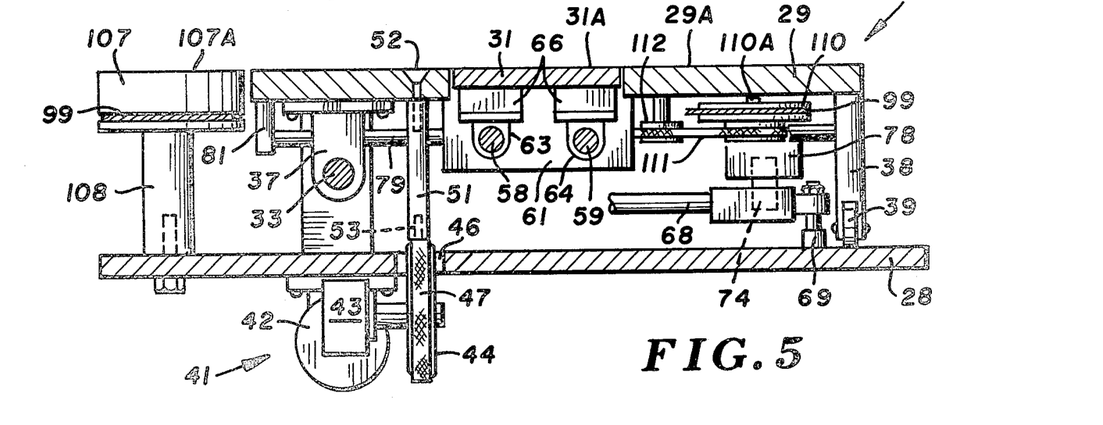
FIG. 5 is an enlarged sectional view taken along the line 5—5 of FIG. 3.

Referring to FIG. 3, photographic reproportioning apparatus 20 has a first or main travel board 29 and a second or sub-travel board 31. Boards 29 and 31 have generally flat upper surfaces 29A and 31A, respectively, that are co-extensive with each other. Surfaces 29A and 31A are located in generally the same horizontal plane. Main travel board 29 is moved in the linear direction of arrow 32 along a linear path relative to the top of support 28. A horizontal linear rod 33 extends longitudinally of support 28. The left end of rod 33 is mounted on an upright mount 34 attached to support 28. The opposite or right end of rod 33 is connected to an upright mount 36 attached to support 28. An elongated linear bearing 37 is slidably mounted on rod 33 between mounts 34 and 36. Linear bearing 37 is attached to the bottom side of main travel board 29 with suitable fasteners, such as bolts. As shown in FIG. 5, linear bearing 37 is attached to the left or inner side of main travel board 29. A downwardly directed leg 38 is attached to the outer or right side of travel board 29. A wheel or roller 39 rotatably mounted on the lower portion of leg 38 rides on the upper surface of support 28. A plurality of wheels are used with leg 38 and additional legs to movably support the outer end of travel board 29 on support 28.

Figure 4:
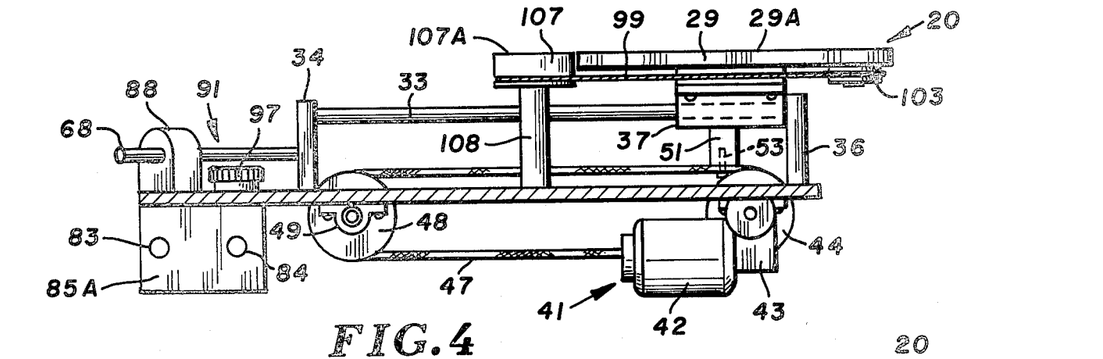
FIG. 4 is a sectional view taken along the line 4—4 of FIG. 3.

A drive means indicated generally at 41 in FIGS. 4 and 5 operates to move main travel board 29 along rod 33 in the linear direction of arrow 32. Drive means 41 comprises a reversible electric motor 42 mounted on a gear box 43. Gear box 43 is secured to this bottom of support 28. a drive pulley 44 is mounted on the output or drive shaft of gear box 43. Pulley 44 has an upper portion that projects through an elongated linear slot 46 in support 28. An endless belt 47, as a V-belt, is trained over drive pulley 44 and an idler pulley 48. Bearings 49 rotatably mount idler pulley 48 on the bottom of support 28 at the right end of slot 46, as shown in FIG. 4. Travel board 29 is connected to the top run of belt 47 with a downwardly directed post or member 51. The upper end of block 51 is attached with bolts 52 to board 29. The lower end of block 51 is secured to belt 47 with a plurality of fasteners 53, such as bolts. Other types of fasteners or connectors can be used to attach block 51 to belt 47. Control unit 24 is electrically connected to motor 42. Control unit 24 has manually operated control members operable to vary the speed of motor 42 and reverse the direction of drive of motor 42. Other controls, as on-off switch and light switch and intensity controls, are incorporated in control unit 24.

Figure 6:
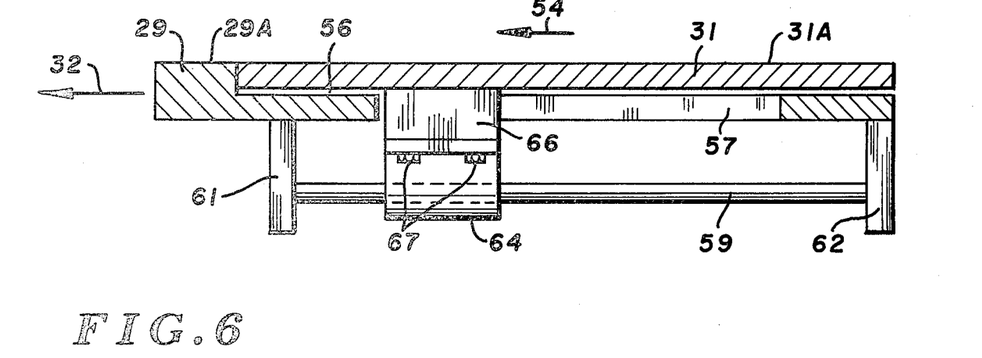
FIG. 6 is an enlarged sectional view taken along the line 6—6 of FIG. 3.

Referring to FIGS. 5 and 6, sub-travel board 31 moves in the linear direction of arrow 54 along with movement of main travel board 29. Board 31 moves in the linear direction at the same speed or less than the speed of movement of board 29. The motion transmission and control structure to attain this movement is hereinafter described. Main travel board 29 has a longitudinal recess 56 accommodating sub-travel board 31. The top surface of board 31 is flat and in general horizontal plane as a top flat surface 29A of main travel board 29. Travel board 29 has a longitudinal opening or hole 57 below board 31. A pair of longitudinal rods 58 and 59 are located below opening 57. The opposite ends of rods 58 and 59 are mounted on end supports 61 and 62 attached to the bottom of main travel board 29. As shown in FIG. 5, a pair of linear bearings 63 and 64 are slidably mounted on rods 58 and 59, respectively. Blocks 66 connected to linear bearings 63 and 64 are attached with fasteners, as bolts 67, to the bottom of sub-travel board 31. Blocks 66 project downwardly through openings 57 to support sub-travel board 31 on linear bearings 63 and 64.

Figure 7:
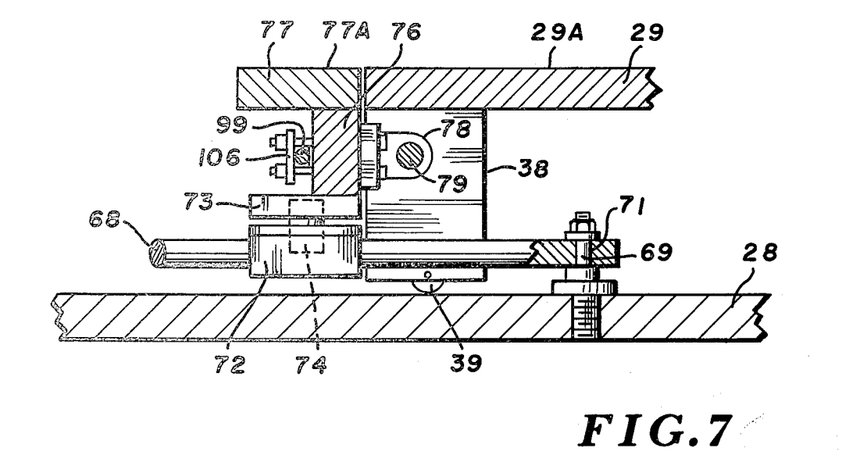
FIG. 7 is an enlarged sectional view taken along the line 7—7 of FIG. 3.

Referring to FIGS. 3 and 7, the motion transmission and control structure for establishing the movement of board 31 relative to board 29 includes an elongated linear speed control rod 68 located adjacent the forward or leading side of main travel board 29. The upper or outer end of rod 68 is pivotally connected to an upright pivot pin 69 secured to support 28. Rod 68 has a hole 71 accommodating pivot pin 69. A slide means having a first linear bearing 72 is slidably mounted on the upper or outer end of rod 68. Bearing 72 is located below a plate 73 and is pivotally attached thereto with an upright pivot pin 74. Plate 73 is secured to the lower part of a block or member 76. A horizontal transversely movable board 77 is secured to the top of block 76. Member 77 has a flat top surface 77A that is located generally in the horizontal plane of top surface 29A of main travel board 29. Member 77 is used to perform back slant and italicize functions.

The slide means includes a linear bearing 78 secured to block 76. Bearing 78 is slidably mounted on a transverse horizontal rod 79. The outer ends of rod 79 are attached to leg 38 and a downwardly directed support 81, as shown in FIG. 5. Support 81 is attached to the lower side adjacent the inside edge of main travel board 29.

Figure 8:
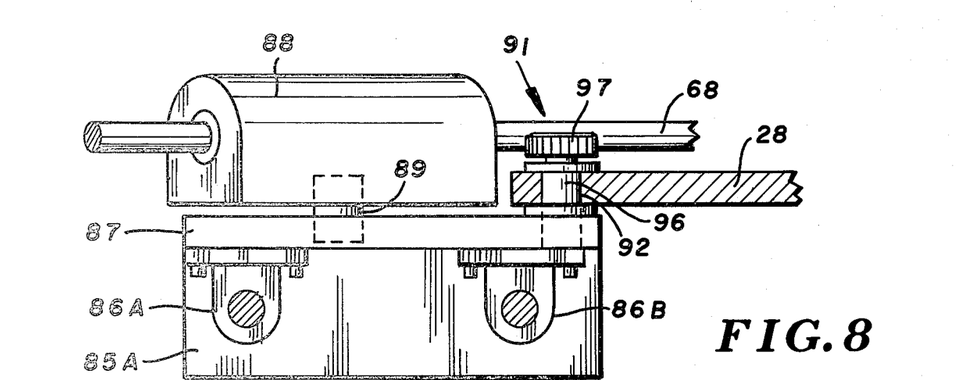
FIG. 8 is an enlarged sectional view taken along the line 8—8 of FIG. 3.

Returning to FIG. 3, support 28 has a transverse cutout 82 in the left end thereof. A pair of transverse rods 83 and 84 located below cutout 82 are attached to downwardly directed supports 85A and 85B, shown in FIGS. 4 and 8. A pair of linear bearings 86A and 86B are slidably mounted on rods 83 and 84, respectively. Linear bearings 86A and 86B are attached to suitable fasteners, such as bolts, to the bottom side of a horizontal plate 87. A linear bearing 88 is located above plate 87 and pivotally connected thereto with an upright pivot pin 89. Rod 68 is slidably mounted in linear bearing 88.

A releasable clamp indicated generally at 91 is used to fix the position of linear bearing 88 relative to the main support 28. Main support 28 has a transverse slot 92 parallel to cutout 82. A scale 93 is imprinted on plate 28 adjacent the opposite edges of slot 92 to calibrate the percentage of enlargement or reduction made by apparatus 20, as determined by the angular position of rod 68. Rod 68 can be moved from a generally 45 degree angle, as shown in solid lines in FIG. 3, to a longitudinal position. The broken line position of rod 68 in FIG. 3 is intermediate between the 45 degree and longitudinal position. When rod 68 is in the longitudinal position, boards 29 and 31 move at the same speed so that the reproportioning percentage is zero. The percentage of reproportioning is determined by the drive ratio between the first or cable drive 99 and second or belt drive 111.

Releasable clamp 91 is used to fix the angular position of rod 68. Clamp 91 includes a slide 94 located in slot 92. Slide 94 has an upper surface containing lines or marking indicia that is used in conjunction with scale 93 to determine the selected position of rod 68. A clamp bolt 96 having an enlarged head 97 is used and is threaded into a portion of slide 94 and operates to clamp the slide to support 28. Head 97 is a convenient size so that it can be conveniently turned with an operator's hand.

Figure 9:
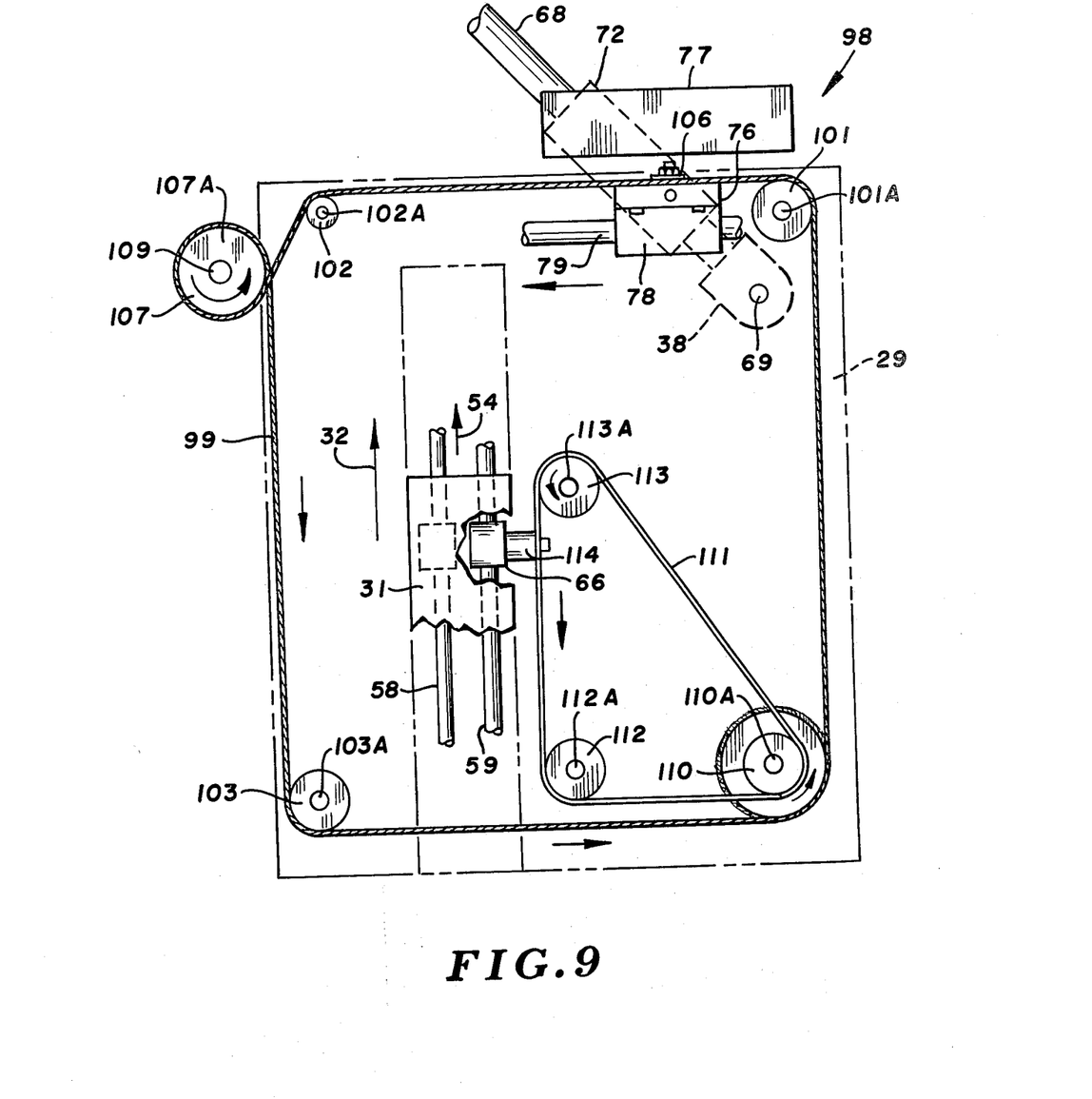
FIG. 9 is a diagrammatic view of the motion transmission means for moving the sub-travel board relative to the main travel board.

Referring to FIG. 9, there is shown motion transmission means indicated generally at 98 operable to effect relative longitudinal movement of sub-travel board 31, as indicated by arrow 54 in response to transverse movement of linear bearing 78 along rod 79. Motion transmission means 94 includes an endless cable 99 or a flexible line trained about pulleys 101, 102, and 103. Pulleys 101–103 are rotatably mounted on downwardly directed axles 101A, 102A, and 103A secured to the bottom side of travel board 29. Cable 99 is attached to block 76 with a connector or clamp 106 to fix cable 99 to block 76 so that cable 99 moves block 76.

Cable 99 is looped about a circular member or wheel 107 rotatably mounted on an upright cylindrical projection 109 on top of an upright pedestal 108. As shown in FIG. 5, pedestal 108 is attached to support 29 and supports wheel 107 adjacent the near or inner edge of travel board 29. Wheel 107 has an upper flat circular surface 107A located in the same general horizontal plane as top surface 29A of travel board 29. Wheel 107 has an outer annular groove in its side wall accommodating a loop section of cable 99.

Returning to FIG. 9, cable 99 is looped about a second motion transmission wheel 110 rotatably mounted on an axle 110A secured to the bottom of travel board 29. Wheel 110 is a dual pulley or speed step down pulley. An endless belt 111, as a V-belt, is trained about the small pulley of wheel 110 and a pair of longitudinally spaced pulleys 112 and 113. Pulleys 112 and 113 are rotatably mounted and downwardly directed axles 112A and 113A are secured to the bottom of travel board 29 adjacent the side of the recess 56 accommodating sub-travel board 31. The portion of belt 111 that extends between pulleys 112 and 113 is connected with connectors or fasteners 114 to block 66 so that belt 111 will move sub-travel board 31 in the direction of the arrow 54. The diameter of wheel 110 is selected to provide a drive speed ratio between the speed of movement of endless cable 99 and the speed of movement of belt 111. The large pulley portion of wheel 110 that accommodates cable 99 is larger in diameter than the pulley portion of wheel 110 that engages belt 111. For example, the wheel 110 can have 6 to 1.5 speed ratio. The smaller the diameter of the portion of wheel 110 that accommodates cable 99, the greater the speed of rotation of wheel 110. Conversely, the larger the diameter of wheel 110 accommodating cable 99, the slower the speed of rotation of wheel 110. The speed step down dual pulley of wheel 110 provides an accurate control over the amount of enlargement and reduction determined by the position of bar 68. The step down ratio of wheel 110 can be changed by replacing wheel 110 with a wheel having a different step down ratio.

Figure 10:
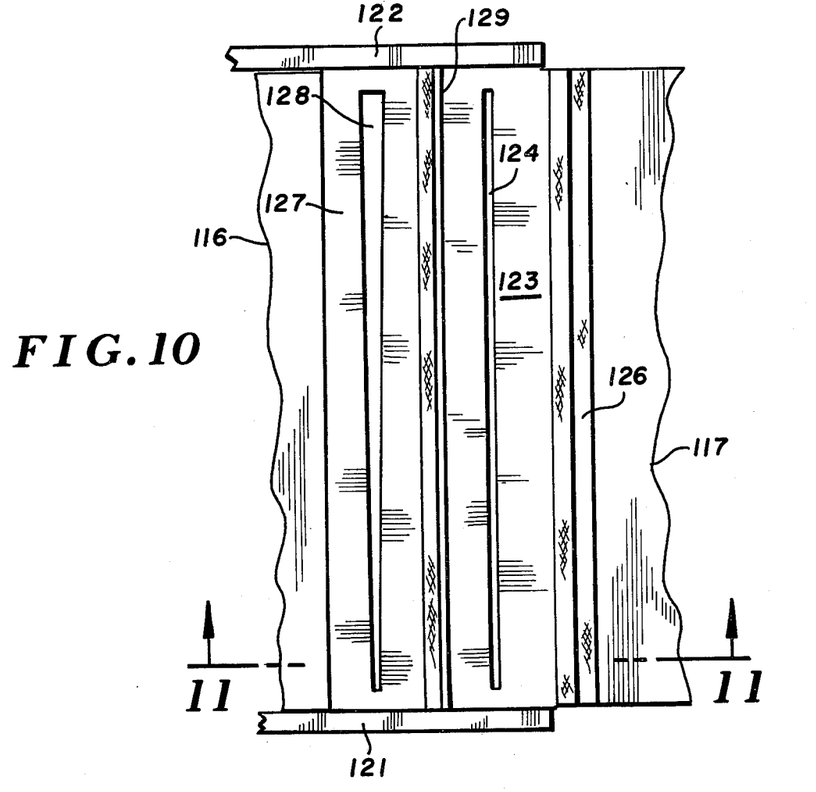
FIG. 10 is an enlarged top plan view of the exposure window apparatus and light mask of the apparatus of FIG. 1.
Figure 11:
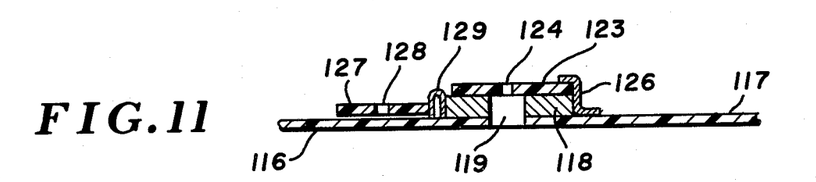
FIG. 11 is a sectional view taken along the line 11—11 of FIG. 10.
Figure 12:
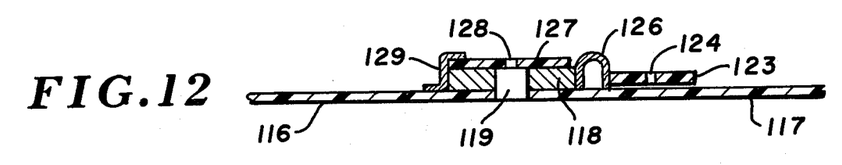
FIG. 12 is a sectional view similar to FIG. 11 showing the tapered exposure window in light-exposing position.

Referring to FIGS. 10–12, the top of boards 29 and 31 are covered with cover means comprising a mask of flexible opaque sheets 116 and 117. Sheets 116 and 117 are connected to a transverse plate 118 having a transverse slot 119. The slot 119 extends transversely across the mid-section of support 28 and the forward ends of the travel boards 29 and 31 and through the axis of rotation of wheel 107. Plate 118 is pivotally connected to panel 25 and opposite side of support 28 with a pair of pivot arms 121 and 122. Arms 121 and 122 allow plate 118 and sheets 116 and 117 attached to the plate to be folded back to an open position to facilitate mounting of the negative and film to travel boards 29 and 31.

Figure 2:
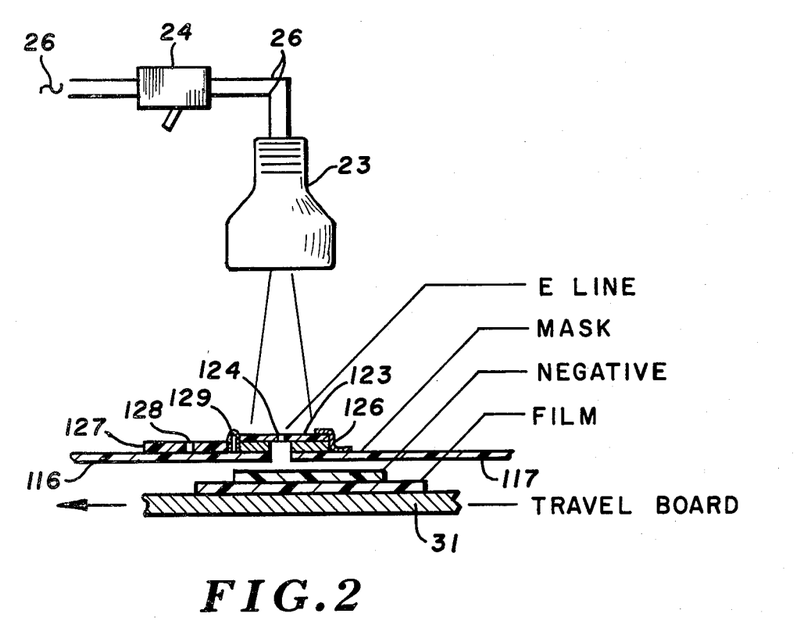
FIG. 2 is a diagrammatic view of the photographic reproportioning system of the apparatus of FIG. 1.

A first elongated opaque film 123 having a transverse E-line or exposure line or window 124 is movably connected to one side of plate 118 with a transverse flexible hinge 126. Film 123, shown in FIG. 11, is located on top of plate 118 with E-line 124 extended generally along the longitudinal center of slot 119. E-line 124 permits an elongated transverse band of light to project down onto the top surfaces of travel boards 29 and 31, as diagrammatically shown in FIG. 2.

A second transverse film 127 having an E-line 128 is movably connected to plate 119 with a flexible transverse hinge 129. E-line 128 diverges outwardly or away from wheel 107 whereby the width of the band of light increases as the function of the distance away from the center of rotation of the wheel 107. As shown in FIG. 12, film 127 is located on top of plate 118 with E-line 128 in general transverse alignment with slot 119. Film 123 has been turned onto sheet 117.

In use, referring to FIG. 3, apparatus 20 is operated in a dark room. The light sensitive or photosensitive member 131, as film, is attached with tape 132 to sub-travel board 31. A sheet containing an image, either negative or positive, is positioned over film 131 and attached to the main travel board 29 with tape 134. Masks 116 and 117 are placed over the travel boards 29 and 31 and film 123 containing the E-line is folded over plate 118, as shown in FIGS. 10 and 11. The percentage of reproportioning of the image on the film is selected by adjusting the angular position of control bar 68. Clamp 91 is released and the plate and linear bearings 87 and 88 are moved along rods 83 and 84 to locate slide 94 in its selected position relative to the scale 93. Clamp 91 is then turned down or fastened to fix the angular position of control bar 68.

The reproportioning operation continues by energizing the motor 42 which causes belt 47 to move thereby moving the main board 29. Linear bearing 72 moves down rod 68. This causes linear bearing 78 to move along rod 79 thereby moving cable 99 around its pulleys 101, 102, and 103. Cable 99 also rotates wheel 110. Rotation of wheel 110 causes belt 111 to move around pulleys 112 and 113. This moves sub-travel board 31 in the linear direction at a slower rate of speed than the main travel board 29. The relative movement between the film and negative in the direction of movement of the main travel board 29 reproportions the image on the film. The result is a change in the image projected on film 31 in the direction of relative movement between the film and negative. The image can be elongated or reduced in one direction depending on which board 29 or 31 the film is attached. The amount of change of the image is dependent upon the angle of bar 68. The reproportioning has the accuracy required for flexographic printing.

Wheel 107 is used to make an arcuate pattern on the photosensitive member. The sheet having the image is attached to the main travel board 29 with suitable tape. The photosensitive member is attached to wheel 107 with tape. The second film 127 having a tapered E-line 128 is located over plate 118, as shown in FIG. 12. The speed of rotation of wheel 107 relative to the longitudinal speed of main travel board 29 is selected by adjusting the angular position of control bar 68. The speed ratio between wheel 107 and travel board 29 determines the radius of curvature of the image projected onto the light sensitive film. The faster the speed of rotation of wheel 107, the smaller the radius of curvature of image. When wheel 107 rotates at a slow speed relative to the linear speed of main travel board 29, the larger or greater the radius of curvature of the image projected on the light sensitive film. Wheel 107 is useable to make arc and circular images on the photosensitive member.

Member 77 is used with travel board 29 to produce back slant and italicize operations. The image carrying sheet or photosensitive member is connected to member 77. The alternate sheet or member is laid against and attached to board 29. The relative movement of the sheet and member past exposure window will produce a changed image on the photosensitive member. The image will be a back slant or italicize representation of the original linear image.

A wave or stepped patterns are made on the photosensitive member with the use of a template 140, shown in FIG. 3, attached to support 28. Template 140 has a reverse curved edge 141. The shape of edge 141 varies with the desired image pattern. First travel board has a transverse groove 142 along its leading edge. A short slide 143 is located in groove 142. An upright sleeve bearing 144 rotatably mounted on slide 143 is adapted to engage the curved edge 141 of template 140 on movement of board 29 toward template 140. A flat carrier 146 is secured to slide 143 and holds a sheet having the image. The photosensitive member is attached to travel board 29. In use, bearing 144 is held in engagement with curved edge 141 of template 140 so that the sheet having the image follows the curve of edge 141. The image projected on the photosensitive member will have the same curve.

While there is disclosed an apparatus for reproportioning one dimension of a two-dimension image, it is understood that changes and variations in size, materials, structure, and components can be made by those skilled in the art without departing from the invention. The invention is defined in the following Claims.

The embodiments of the invention in which an exclusive property or privilege is claimed are defined as follows:

1. An apparatus for changing one dimension of a two-dimension image projected on a photosensitive member comprising: a support, first means having a surface for carrying a sheet having an image thereon or a photosensitive member, means supporting the first means on the support for movement in a linear direction, second means having a surface for carrying a sheet having an image thereon or a photosensitive member, means movably mounting the second means on the first means for movement in the linear direction of movement of the first means, said surface of the first means being generally flat, and the surface of the second means being generally flat and located in the same general plane as the surface of the first means, drive means connected to the first means to move the first means in said linear direction, opaque means for covering the surfaces of the first and second means, means having an elongated exposure window extended transversely of the first and second means allowing light to project onto said surfaces of the first and second means and sheet and member carried by said first and second means, and control means for moving the second means in the linear direction at a speed equal to or less than the speed of the first means, said control means including first rod means, means movably mounting the first rod means on the support, means for adjusting and holding the first rod means in a selected position, slide means mounted on the first rod means and movable along the length of the first rod means, second rod means mounted on the first means extended transversely of the linear direction, said slide means movably mounted on the second rod means for movement along the length thereof, and motion transmitting means connected to the slide means and second means operable to move the second means in said linear direction in response to movement of the first means in said linear direction.

2. The apparatus of claim 1 wherein: said second means is a plate surrounded on three sides by the first means.

3. The apparatus of claim 1 wherein: the first means has a recess extended in said linear direction, second means being located in said recess.

4. The apparatus of claim 3 wherein: said recess is located generally in the central portion of the first means.

5. The apparatus of claim 1 wherein: the means movably mounting the second means on the first means includes third rod means extended in the linear direction and bearing means mounted on the rod means connected to the second means.

6. The apparatus of claim 5 wherein: the third rod means includes a plurality of rods, and the bearing means includes linear bearings mounted on the rods.

7. The apparatus of claim 1 wherein: the means movably supporting the first means on the support includes a linear rod mounted on the support, linear bearing means slidably mounted on the rod and attached to the first means, and wheel means connected to the first means and engageable with the support.

8. The apparatus of claim 1 wherein: the means movably mounting the first rod means on the support includes pivot means connecting one end of the first rod means to the support.

9. The apparatus of claim 8 wherein: the means for adjusting and holding the first rod means includes transverse rod means mounted on the support, bearing means connecting the transverse rod means and first rod means, and releasable clamp means operable to hold the bearing means in a selected position thereby fixing the angle of the first rod means.

10. The apparatus of claim 1 wherein: said means having an elongated exposure window includes an opaque sheet having an elongated transparent line.

11. The apparatus of claim 1 including: means having a transverse slot pivotally mounted to the support, said means having an elongated exposure window being mounted on said means having a transverse slot, said opaque cover being attached to said means having a transverse slot.

12. The apparatus of claim 11 wherein: said means having an elongated exposure window includes an opaque sheet having an elongated transparent line.

13. The apparatus of claim 12 including: hinge means connecting the opaque sheet having an elongated transparent line to said means having a transverse slot.

14. The apparatus of claim 1 wherein: the drive means includes a drive motor mounted on the support and power transmission means connecting the motor to the first means whereby operation of the motor moves the first means in said linear direction.

15. The apparatus of claim 1 wherein: the first means is a first flat plate having a recess extended in said linear direction, and said second means is a second flat plate located in said recess.

16. The apparatus of claim 15 wherein: the recess is located generally along the central portion of the first flat plate.

17. The apparatus of claim 1 wherein: the motion transmitting means includes first drive means mounted for movement on the first means, means connecting the first drive means to the slide means whereby movement of the slide means along the second rod means moves the first drive means, and second drive means mounted for movement on the first means, means connecting the second drive means to the second means, and means drivably interconnecting the first drive means with the second drive means whereby the second drive means moves in response to movement of the first drive means thereby moving the second means relative to the first means in said linear direction.

18. The apparatus of claim 17 wherein: the means drivably interconnecting the first drive means with the second drive means includes a rotating member.

19. The apparatus of claim 17 wherein: the first drive means includes a cable, and pulleys accommodating the cable rotatably connected to the first means.

20. The apparatus of claim 17 wherein: the second drive means includes an endless drive member, and pulleys accommodating the endless drive member, said means connecting the second drive means to the second means being connected to the endless drive member.

21. The apparatus of claim 17 wherein: the first drive means includes a cable, and means movably mounting the cable on the first means, said second drive means includes an endless drive member, and means movably mounting the endless drive member on the first means, said means connecting the second drive means to the second means being connected to the endless drive member, and said means drivably interconnecting the first drive means with the second drive means including rotatable means located in drivng engagement with the cable and the endless drive member whereby movement of the cable moves the endless drive member thereby moving the second means relative to the first means in said first direction.

22. The apparatus of claim 21 wherein: the rotatable means is a wheel having different diameter portions located in driving engagement with the cable and endless drive member whereby the wheel provides a speed ratio between the cable and endless drive member.

23. An apparatus for changing one dimension of a two-dimension image projected on a photosensitive member comprising: a support, first means for carrying a sheet having an image thereon or a photosensitive member, means movably supporting the first means for movement in a linear direction, second means for carrying a sheet having an image thereon or a photosensitive member, said first means having a recess extended in said linear direction accommodating the second means, support means locating the second means in said recess and mounting the second means on the first means for movement in the linear direction of movement of the first means, drive means connected to the first means to move the first means in said linear direction, opaque means for covering the first and second means, means having an elongated exposure window extended transversely of the first and second means allowing light to project onto the first and second means and sheet and member carried by said first and second means, and control means for moving the second means in the linear direction at a speed equal to or less than the speed of the first means.

24. The apparatus of claim 23 wherein: the first means has a generally flat first surface and the second means has a generally flat second surface located in the same general plane as the first surface.

25. The apparatus of claim 23 wherein: said recess is located generally in the central portion of the first means.

26. The apparatus of claim 23 wherein: the first means is a first flat plate having a recess extended in said linear direction, and said second means is a second flat plate located in said recess, said plates having surfaces located in generally the same plane.

27. The apparatus of claim 26 wherein: the second plate is surrounded on three sides by the first plate.

28. The apparatus of claim 23 wherein: the support means includes rod means extended in the linear direction and bearing means mounted on the rod means connected to the second means.

29. The apparatus of claim 28 wherein: the rod means includes a plurality of rods, and the bearing means includes linear bearings mounted on the rods.

30. The apparatus of claim 23 wherein: the means movably supporting the first means includes a linear rod mounted on the support, linear bearing means slidably mounted on the rod and attached to the first means and engageable with the support.

31. The apparatus of claim 23 wherein: said means having an elongated exposure window includes an opaque sheet having an elongated transparent line.

32. The apparatus of claim 23 including: means having a transverse slot pivotally mounted to the support, said means having an elongated exposure window being mounted on said means having a transverse slot, said opaque means for covering being attached to said means having a transverse slot.

33. The apparatus of claim 32 wherein: said means having an elongated exposure window includes an opaque sheet having an elongated transparent line.

34. The apparatus of claim 33 including: hinge means connecting the opaque sheet having an elongated transparent line to said means having a transparent slot.

35. An apparatus for changing one dimension of a two-dimension image projected on a photosensitive member comprising: a support, first means for carrying a sheet having an image thereon or a photosensitive member, means movably supporting the first means on the support for movement in a linear direction, second means connectable to a sheet having an image thereon or a photosensitive member, said first means and second means each having a surface, each surface being located in generally the same plane, means mounting the second means for movement about an axis, drive means connected to the first means to move the first means in said linear direction, opaque means for covering the first and second means, means having an elongated exposure window extended transversely of the first means allowing light to project onto the first means, sheet, and member, and means for rotating the second means relative to the first means, said means for rotating the second means including drive means cooperating with the first means for rotating the second means at a speed relative to the first means.

36. The apparatus of claim 35 wherein: said second means is a circular member.

37. The apparatus of claim 35 wherein: the means having an elongated light exposure window includes a plate having a slot extended transversely of the linear direction of movement of the first means, and an opaque sheet having said elongated tapered light exposure window located on the plate with the window aligned with the slot.

38. The apparatus of claim 35 wherein: the means mounting the second means is secured to the support.

39. The apparatus of claim 35 wherein: the exposure window diverges outwardly from the second means.

40. The apparatus of claim 35 wherein: said means for rotating the second means includes a control rod, said drive means cooperating with the control rod and first means to rotate the second means.

41. The apparatus of claim 40 including: means for adjusting and holding the control rod in a selected position to control the speed of rotation of the second means relative to the linear speed of the first means.

42. An apparatus for changing one dimension of a two-dimension image projected on a photosensitive member comprising: a support, first means for carrying a sheet having an image thereon or a photosensitive member, means movably supporting the first means on the support for movement in a linear direction, second means connectable to a sheet having an image thereon or a photosensitive member, said first means and second means each having a surface, each surface being located in generally the same plane, means mounting the second means for movement about an axis, drive means connected to the first means to move the first means in said linear direction, opaque means for covering the first and second means, means having an elongated exposure window extended transversely of the first means allowing light to project onto the first means, sheet, and member, and means for rotating the second means relative to the first means, said means for rotating the second means including drive means cooperating with the first means for rotating the second means at a speed relative to the first means, said drive means including a control rod, slide means mounted on the control rod and movable along the length of the control rod, second rod means mounted on the first means, said slide means being movably mounted on the second rod means, and motion transmission means connected to the slide means, first means, and second means operable to rotate the second means in response to linear movement of the first means.

43. The apparatus of claim 42 wherein: said motion transmission means includes a cable connected to the slide means, said cable being movably mounted on the first means, and surrounding the second means whereby movement of the cable rotates the second means.

44. The apparatus of claim 42 including: means for adjusting and holding the control rod in a selected position to control the speed of rotation of the second means relative to the linear speed of the first means.

45. A light mask for a photographic reproportioning apparatus having a first means movable in a linear direction, said first means adapted to support a sheet having an image thereon or a photosensitive member, and a second means rotatable relative to the first means about an axis extended normal to said linear direction, said second means having a means adapted to be attached to a sheet having an image thereon or a photosensitive member, comprising: opaque means for covering the first and second means to shield the first and second means and photosensitive member supported thereon from a light source, and means having an elongated light exposure window aligned with said axis of rotation of the second means and cooperating with the opaque means to direct light to the first means, said window having a taper that diverges away from the axis of rotation of said second means transversely of the linear direction across the first means.

46. The mask of claim 45 including: a plate having a slot extended transversely of the linear direction across the first means, said means having an elongated light exposure window being attached to the plate with the window aligned with the slot.

47. The mask of claim 45 wherein: the opaque means are sheet members attached to the means having an elongated light exposure window.

48. The mask of claim 45 wherein: the means having an elongated light exposure window includes a plate having a slot extended transversely of the linear direction of movement of the first means, and an opaque sheet having said elongated tapered light exposure window located on the plate with the window aligned with the slot.

49. The mask of claim 48 including: a second opaque sheet including an elongated light exposure window having a uniform width useable in lieu of the opaque sheet having the tapered light exposure window.

50. A light mask for a photographic reproportioning apparatus having a first means movable in a linear direction and a second means rotatable relative to the first means comprising: opaque means for covering the first and second means to shield the first and second means from a light source, and means having an elongated light exposure window cooperating with the opaque means to direct light to the first means, said means having an elongated light exposure window including a plate having a slot extended transversely of the linear direction of movement of the first means, a first opaque sheet having an elongated tapered light exposure, first window located on the plate with the window aligned with the slot, said first window having a taper that diverges away from said second means, a second opaque sheet including an elongated light exposure, second window having a uniform width useable in lieu of the first opaque sheet, and first means hinging the first opaque sheet with the tapered exposure window to the plate, and second means hinging the second opaque sheet to the plate to selectively align the first and second opaque sheets with the slot.

51. The mask of claim 50 wherein: the opaque means are sheet members attached to the means having an elongated light exposure window.

52. An apparatus for changing one dimension of a two-dimension image projected on a photosensitive member comprising: a support, first means for carrying a sheet having an image thereon or a photosensitive member, means movably supporting the first means on a support for movement in a linear direction, second means connectable to a sheet member having an image thereon or a photosensitive member, means mounting the second means for rotation about an axis extended normal to the linear direction of movement of the first means, drive means connected to the first means to move the first means in said linear direction, opaque means for covering the first and second means, means having an elongated exposure window extended transversely of the first means allowing light to project onto the first means, a sheet having an image thereon, and photosensitive member, said exposure window having a taper that diverges away from the axis of rotation of the second means, said exposure window being aligned with the axis of rotation of the second means, and means for rotating the second means relative to the first means.

53. The apparatus of claim 52 wherein: said second means is a circular member.

54. The apparatus of claim 52 wherein: the first means and second means each have a surface, each surface being located in generally the same plane.

55. The apparatus of claim 52 wherein: the means mounting the second means is secured to the support.

56. The apparatus of claim 52 including: a plate having a slot extended transversely of the linear direction across the first means, said means having an elongated light exposure window being attached to the plate with the window aligned with the slot.

57. The apparatus of claim 52 wherein: the opaque means are sheet members attached to the means having an elongated light exposure window.

58. The apparatus of claim 52 wherein: the means having an elongated light exposure window includes a plate having a slot extended transversely of the linear direction of movement of the first means, and an opaque sheet having said elongated tapered light exposure window located on the plate with the window aligned with the slot.

59. The apparatus of claim 58 including: a second opaque sheet including an elongated light exposure window having uniform width useable in lieu of the opaque sheet having the tapered light exposure window.

60. The apparatus of claim 59 including: first means movably connecting the opaque sheet with tapered exposure window to the plate, and second means movably attaching the second opaque sheet to the plate to selectively align the opaque sheets with the slots.

* * * * *